Dec. 24, 1963 W. G. PULLEN 3,115,193
COMBINATION SOIL LOOSENING AND VEGETATION CHOPPING DEVICE
Filed Jan. 4, 1962
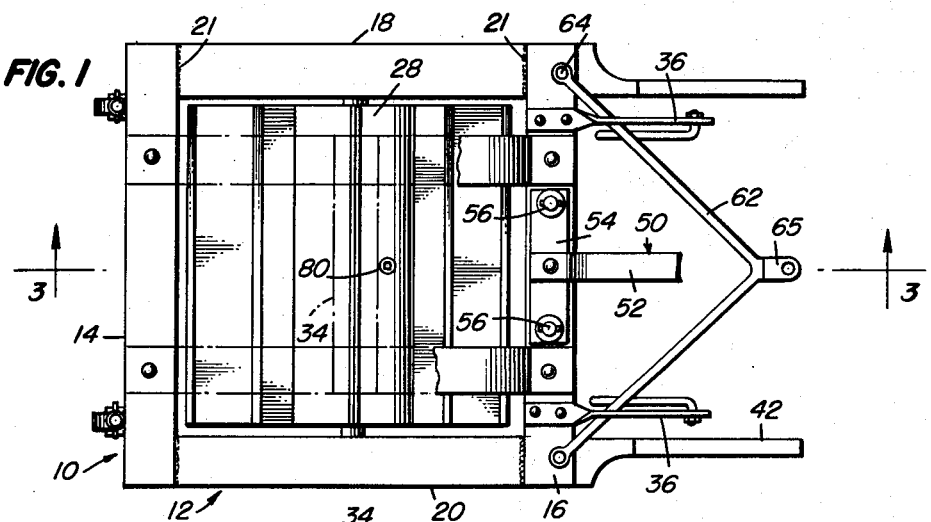
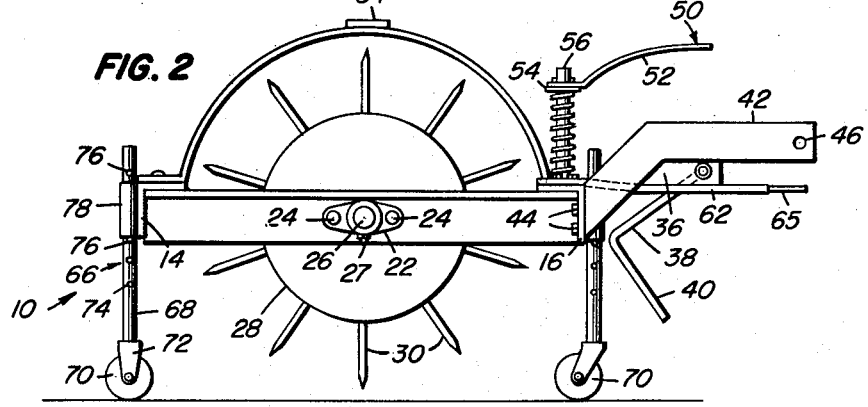
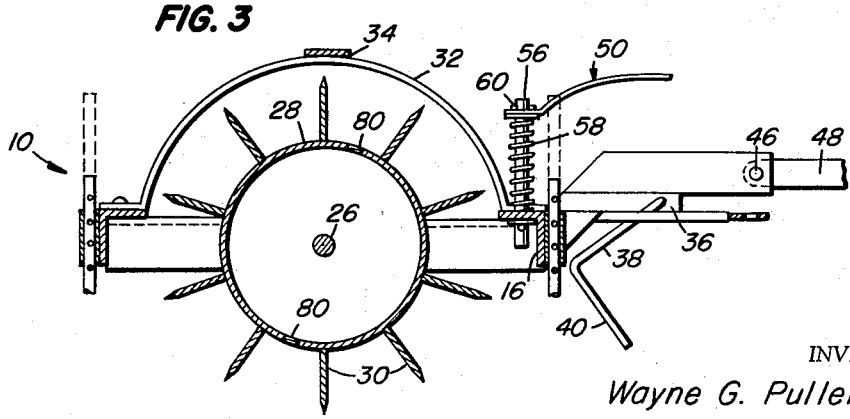
INVENTOR
Wayne G. Pullen
ATTORNEY

United States Patent Office 3,115,193
Patented Dec. 24, 1963

3,115,193
COMBINATION SOIL LOOSENING AND VEGE-
TATION CHOPPING DEVICE
Wayne G. Pullen, Rte. 3, Box 174, Jasper, Tex.
Filed Jan. 4, 1962, Ser. No. 163,987
2 Claims. (Cl. 172—177)

This invention relates to a combination soil loosening and vegetation chopping device, and has for an object to provide an improved soil loosening and vegetation chopping device particularly intended for use in cultivation of the soil, loosening the soil and chopping up any vegetation that may be on the soil into such short lengths that it will readily be embedded into the soil.

A further object of this invention is to provide a device which may be drawn by conventional existing tractors, particularly farm tractors as well as other types of tractors, which may be readily transported in non-operative position and which may be drawn by a tractor in operative position and, which, when used with a tractor having a conventional hydraulic lift mechanism, may cooperate with such lift mechanism both for applying any desired amount of pressure thereto in operative use, and for lifting the device out of contact with the soil when being transported in non-operative position.

Still a further object of this invention is to provide a combination soil loosening and vegetation chopping device including one set of attachments which may cooperate with the hydraulic lift of a conventional tractor, and having a different set of attachments for cooperation with a tractor which does not have a conventional hydraulic lift.

Still a further object of this invention is to provide a soil loosening and vegetation chopping device which is self-sharpening and self-cleaning and, when used with a tractor having a hydraulic lift, can be of light weight inasmuch as any amount of pressure can be applied by the hydraulic lift of the tractor.

Still a further object of this invention is to provide a combination soil loosening and vegetation chopping device which can also be used in some types of construction work for loosening soil, etc., and which will give years of service at little cost.

With the above and related objects in view, this invention consists in the details of construction and combination of parts, as will be more fully understood from the following description, when read in conjunction with the accompanying drawing, in which:

FIG. 1 is a top plan view of the soil loosening and vegetation chopping device of this invention.

FIG. 2 is a side elevational view of FIG. 1.

FIG. 3 is a sectional view on line 3—3 of FIG. 1.

There is shown at 10 the combination soil loosening and vegetation chopping device of this invention. This device includes a rectangular framework 12 consisting of a rear end angle bar 14 and a front end angle bar 16 between which are welded side angle bars 18 and 20, as at weld lines 21.

Secured centrally of the side angle bars 18 and 20 in aligned arrangement are a pair of bearing and/or bushing members 22 as by bolts 24 for journaling the axle 26 of a drum 28 therethrough, the angle bars, of course, being suitably apertured to permit the axle 26 to extend into and be journaled in the bearings and/or bushings 22, a suitable grease fitting 27 being provided on each bearing or bushing 22. The drum 28 may be of any suitable material and is here shown as being a hollow, metal drum.

Suitably spaced about the drum 28 and secured thereto as by welding or otherwise, are a plurality of radially extending blades 30, the planes of each blade 30 extending through the axis of the axle 26, the blades 30 being preferably equally spaced apart about the circumference of the drum 28. The diameter of the drum 28 is such that the drum and its blades 30 may readily rotate within the space provided within the rectangular framework 12. Guard bars 32 suitably secured to the angle bars 14 and 16 may extend over the blades 30, as shown, and a transverse guard bar 34 may be secured across the top of the arcuate guard bars 32. Obviously, in the interest of safety, as many additional transverse guard bars 34 may be provided as necessary to completely enclose the top portion of the drum and blades if desired.

A pair of forwardly extending arms 36 is secured on the forward angle bar 16, and pivotally depending from each of the arms 36 is a stalk placer, or angular rake tooth 38. The angular teeth ends 40 of these stalk placers 38 tend to rake the ground when the device is in operation, these spaced apart teeth tending to cause any vegetation such as stalks, etc., to be moved to a position parallel to the path of movement of the device so that they will be chopped up into short lengths by the chopper blades 30 as they pass thereover. While only two stalk placers 38 are shown, obviously, a few more spaced therebetween may be added if desired.

In operation, the soil loosener and vegetation chopper 10 is drawn over the field, being operated on by any suitable tractor. When the tractor is provided with the conventional hydraulic lift, which normally includes a pair of spaced apart lower links and an intermediate upper link, all hydraulically operated by the pulling tractor, one set of attachments is provided for cooperation between the tractor and the device of this invention. This set includes a pair of upwardly angled, forwardly extending spaced apart draw bars 42, which is secured in any suitable manner, as by bolts or nuts at 44, to the forward angle bar 16 and apertured as at 46 for cooperation with the spaced apart lower links of a tractor having a hydraulic lift, one of such links being shown at 48.

Cooperating means for the intermediate upper lift link of the hydraulic pressure system of the tractor is provided by a T-bar 50, whose curved stem 52 is secured to a T-head 54 extending transversely thereof and apertured at its ends to slidably fit over spaced apart stanchions 56 suitably secured in suitably spaced apart locations on the forward angle bar 16. A coil spring 58 is located about each stanchion 56, resting on angle bar 16, and supports the T-bar 50 above the forward angle bar 16, and the T-head 54 is confined on the stanchions 56 between the coil springs 58 and strong pins 60 extending transversely through the stanchions 56. As a result, lifting action by the hydraulic lift of the tractor on the T-bar 50 will, through the stanchions 56, lift up the whole device 10, pivoting it, as at 46, about the lower tractor links 48 and supporting the weight of the device 10 with its blades 30 entirely out of contact with the soil or the surface on which the tractor itself may be moved, for transporting the device 10 between operating location and storage location.

When in operating location, appropriate downward pressure on the T-bar 50 would transmit any desired amount of downward pressure on the angle bar 16 and thus, on the device 10 to press the blades 30 into the soil for chopping and loosening purposes with any desired amount of pressure, eliminating the necessity of any heavy weight thereon.

When the device is to be operated by a tractor not having the hydraulic lift, then a different set of attachments may be provided, including a yoke bar 62 detachably securable as by bolts 64 adjacent opposite ends of the forward angle iron 16. The yoke bar 62 is provided with a tractor-cooperating ear 65, which may be suitably and conventionally attached to the draw bar of the pulling tractor. In order to permit the soil loosening and vegetation chopping device 10 to be transported between storage location and operative location, three or more removable trolleys 66 are provided. The trolleys 66 include standards 68 provided at their bottom with rollers 70 journaled thereto by the yokes 72, the standards being circular in cross section and provided with a number of spaced transverse pin receiving apertures 74 for receiving supporting pins 76 therethrough and adjustably holding the standards 68 in desired locations on sleeves 78 secured to the device 10, two of these sleeves 78 being secured on the rear angle iron 14 adjacent opposite ends thereof, and one of these sleeves being secured to the forward angle iron 16 approximately at the middle thereof. With the trolley standards 68 mounted as illustrated in FIG. 2, the tractor draw bar may be attached at 65 to the yoke 62 and transport the device 10 over any flat surface such as a roadway or the like, without causing any damage thereto. When it is to be placed in soil loosening and vegetation chopping position, the lower pin 76 is removed and the standards 68 moved upwardly in the sleeves 78 so as to support the rollers 70 above the level of the circumference of the drum 28. If the drum 28 is made of hollow metal as illustrated, then a plug 80 may be provided in the surface thereof through which a liquid such as water may be added when desired, to increase the weight of the device to the desired amount when in operative location, and then the water may be drained through the same plug before transporting it on the trolleys to storage location. Oppositely located plugs 80 may be provided to provide vents to facilitate drainage.

Although this invention has been described in considerable detail, such description is intended as being illustrative rather than limiting, since the invention may be variously embodied, and the scope of the invention is to be determined as claimed.

Having thus set forth and described the nature of this invention, what is claimed is:

1. A combination soil loosening and vegetation chopping device comprising a rectangular framework, a drum journaled to two opposite side members of said rectangular framework, a plurality of blades secured to and extending a substantial distance from said drum radially thereof in planes intersecting the drum axis, forwardly extending arms on said framework and a plurality of rake teeth pivotally depending from said extending arms to place vegetation longitudinally of the path of movement of said device, and means attached to said framework for supporting said framework and drum with said blades in non-operative position while said device is being transported, said framework supporting means comprising means cooperating with the hydraulic links of a tractor vehicle, said cooperating means comprising a draw bar rigidly secured to opposite ends of the forward side of said framework, each said draw bar being connectable to the outer links of the tractor vehicle, and a center lift and pressure T-bar connectable at its stem end to the center hydraulic lift link of the tractor vehicle, the ends of the T-head of said T-bar being apertured, a pair of spaced apart standards secured to the forward side of said framework extending through the apertures in said T-head, coil springs about said standards between said T-head and said framework yieldably resisting the downward movement of said T-head thereon, and stop means on each standard above said T-bar limiting the upward movement of said T-head, whereby the tractor vehicle hydraulic links may be manipulated to exert increased pressure on said drum and blades or to lift and carry said drum and blades out of operative contact with the soil.

2. The device of claim 1, in combination with alternate framework supporting means comprising at least three trolley devices, each trolley device comprising a standard, a roller journaled to the bottom end of said standard, the sides of said framework having spaced apart standard receiving apertures therethrough located in at least two of the sides thereof, each trolley standard having transverse pin receiving apertures and pins for adjustably supporting said framework sides on said trolley devices when said trolley devices are in use, or supporting said trolley devices on said framework sides when said drum blades are in use, and a yoke draw bar detachably secured to said framework.

References Cited in the file of this patent

UNITED STATES PATENTS

| | | |
|---|---|---|
| 489,047 | Townsend | Jan. 3, 1893 |
| 983,477 | Brown | Feb. 7, 1911 |
| 1,553,462 | Newton | Sept. 15, 1925 |
| 1,650,472 | Smith | Nov. 22, 1927 |
| 1,801,923 | Kella | Apr. 21, 1931 |
| 2,487,955 | Todd | Nov. 15, 1949 |

FOREIGN PATENTS

| | | |
|---|---|---|
| 166,439 | Austria | July 25, 1950 |
| 1,062,728 | France | Dec. 9, 1953 |